United States Patent
Curat et al.

(10) Patent No.: US 11,845,303 B2
(45) Date of Patent: Dec. 19, 2023

(54) TREAD STRUCTURE OF AN AGRICULTURAL VEHICLE TIRE

(71) Applicant: COMPAGNIE GENERALE DES ETABLISSEMENTS MICHELIN, Clermont-Ferrand (FR)

(72) Inventors: Alexandra Curat, Clermont-Ferrand (FR); Florence Tran, Clermont-Ferrand (FR); Jean-Luc Cabioch, Clermont-Ferrand (FR); Anthony Monod, Clermont-Ferrand (FR); Eduardo Anton-Antolin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 625 days.

(21) Appl. No.: 17/048,976

(22) PCT Filed: Apr. 11, 2019

(86) PCT No.: PCT/FR2019/050854
§ 371 (c)(1),
(2) Date: Oct. 19, 2020

(87) PCT Pub. No.: WO2019/202238
PCT Pub. Date: Oct. 24, 2019

(65) Prior Publication Data
US 2021/0237516 A1 Aug. 5, 2021

(30) Foreign Application Priority Data
Apr. 20, 2018 (FR) ...................................... 1853488

(51) Int. Cl.
*B60C 11/11* (2006.01)
*B60C 11/03* (2006.01)
(Continued)

(52) U.S. Cl.
CPC ............. *B60C 11/11* (2013.01); *B60C 11/005* (2013.01); *B60C 11/0075* (2013.01);
(Continued)

(58) Field of Classification Search
CPC ............... B60C 11/005; B60C 11/0311; B60C 2011/0025; B60C 2011/0033; B60C 2011/0313; B60C 2200/08
See application file for complete search history.

(56) References Cited

U.S. PATENT DOCUMENTS

| 4,383,567 A | 5/1983 | Crum et al. |
| 4,534,392 A | 8/1985 | Bonko et al. |

(Continued)

FOREIGN PATENT DOCUMENTS

| EP | 0 818 501 | 1/1998 |
| EP | 3 141 402 | 3/2017 |

(Continued)

OTHER PUBLICATIONS

Numata, JP H061120 A English Machine Translation, 1994 (Year: 1994).*

*Primary Examiner* — Justin R Fischer
*Assistant Examiner* — Brendon Charles Darby
(74) *Attorney, Agent, or Firm* — Cozen O'Connor

(57) ABSTRACT

Agricultural vehicle tire having tread (1) with bearing surface (10) on which main lugs (3) and shorter secondary lugs (3) are formed on each side of the equatorial mid-plane (XX'), each secondary lug (3) interposed between two main lugs (2). The main lugs (2) and secondary lugs (3) make up, in the radial direction, a lens (21, 31) of a first material, each lens (21, 31) surmounted by a second material extending to the contact face of the main lugs and the secondary lugs. The viscous modulus G'1 of the first material is at most 60% of the viscous modulus G'2 of the second material. The com-
(Continued)

SECTION ON III-III plex modulus G'1 of the first material differs from the complex modulus G'2 of the second material, the difference between these complex moduli being at most 30% of the complex modulus G'2 of the second material.

11 Claims, 2 Drawing Sheets

(51) Int. Cl.
  *B60C 11/00* (2006.01)
  *B60C 9/18* (2006.01)

(52) U.S. Cl.
  CPC ....... *B60C 11/0302* (2013.01); *B60C 11/0311* (2013.01); *B60C 2009/1857* (2013.01); *B60C 2011/0025* (2013.01); *B60C 2011/0033* (2013.01); *B60C 2011/0313* (2013.01); *B60C 2200/08* (2013.01)

(56) References Cited

U.S. PATENT DOCUMENTS

| | | | |
|---|---|---|---|
| 5,046,541 A | | 9/1991 | Bonko |
| 5,056,573 A | * | 10/1991 | O'Brien .............. B60C 11/0311 |
| | | | 152/209.12 |
| 5,411,067 A | | 5/1995 | Beeghly et al. |
| 2010/0300588 A1 | * | 12/2010 | Otsuji ..................... B60C 11/03 |
| | | | 152/209.16 |
| 2013/0292019 A1 | * | 11/2013 | Vervaet ................. B60C 11/033 |
| | | | 152/209.18 |
| 2017/0008344 A1 | * | 1/2017 | Vervaet ................... B60C 11/11 |
| 2018/0178586 A1 | * | 6/2018 | Onishi ................ B60C 11/0332 |
| 2018/0370293 A1 | * | 12/2018 | Vervaet .............. B60C 11/0316 |

FOREIGN PATENT DOCUMENTS

| | | | |
|---|---|---|---|
| FR | 2 999 117 | | 6/2014 |
| JP | 06001120 A | * | 1/1994 |
| WO | WO 2015/091731 | | 6/2015 |

* cited by examiner

SECTION ON II-II

SECTION ON III-III

TREAD STRUCTURE OF AN AGRICULTURAL VEHICLE TIRE

RELATED APPLICATIONS

This is a U.S. National Phase Application under 35 USC 371 of International Application PCT/FR2019/050854 filed on Apr. 11, 2019.

This application claims the priority of French application no. 18/53488 filed Apr. 20, 2018, the entire content of which is hereby incorporated by reference.

FIELD OF THE INVENTION

The present invention relates to a tire intended to equip an agricultural vehicle, and more particularly a tire of which the rolling resistance is improved.

BACKGROUND OF THE INVENTION

Although not limited to this application, the invention will be more particularly described with reference to a multipurpose agricultural vehicle, that is to say a vehicle that can be driven both in the fields on loose ground and on roads, such as an agricultural tractor.

A tire for an agricultural vehicle is intended to run over various types of ground such as the more or less compact soil of the fields, unmade tracks providing access to the fields, and the tarmacked surfaces of roads. Bearing in mind this diversity of use, in the fields and on the road, a tire for an agricultural tractor, and in particular the tread thereof, that is intended to come into contact with the ground, needs to offer a balance of performance properties, in particular appropriate traction when working in the fields and good resistance to chunking of material caused by rolling over aggressive bodies. Furthermore these tires need to exhibit good resistance to wear on the road and when running on a curved path, low rolling resistance and good vibrational comfort.

Definitions

Equatorial mid-plane: a plane that is perpendicular to the axis of rotation and divides the tire into two equal or substantially equal halves.

In the present document, a radial direction means any direction that is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

Axially or radially outwards should be understood here as a direction that is oriented towards the outside of the internal cavity of the tire, this cavity containing the air with which the tire is inflated.

The usual running conditions of the tire or use conditions are those that are defined notably by the E.T.R.T.O. standard for the European market, or the T.R.A. standard for the American market; these use conditions specify the reference inflation pressure corresponding to the load-bearing capacity of the tire as indicated by its load index and speed rating. These use conditions may also be referred to as "nominal conditions" or "working conditions".

A surface void ratio for a tread or for a region delimited axially on a tread is defined as the ratio between the surface area that comes into contact with a roadway and the total surface area including both the contact surface area and the surface area of the voids, this ratio being calculated either for the entire width of the tread or for the limited region of the tread.

The terms: complex modulus, elastic modulus, viscous modulus denote, for a person skilled in the art of elastomers, well-known dynamic properties. The complex modulus of a material, denoted G*, is defined by the following relationship:

$$G^* = \sqrt{G'^2 + G''^2}$$

expression in which G' represents the elastic modulus and G" represents the viscous modulus. The phase angle δ, between the force and the displacement, expressed as a dynamic loss tan δ, is equal to the ratio G"/G'.

These properties can be measured on bonded test specimens taken from a tread of a tire. Test specimens such as those described in the standard ASTM D 5992-96 (version published in September 2006) can be used. The test specimen employed is cylindrical with a diameter equal to 10 mm and a height equal to 2 mm.

The test specimen is subjected to a simple alternating sinusoidal shear stress at a frequency of 10 Hz with an imposed stress symmetrically about its equilibrium position. The test specimen is made to undergo accommodation prior to the temperature sweep measurement. For that purpose, the test specimen is subjected to sinusoidal shear stress loading at 10 Hz, at 100% full-scale deformation, at a temperature of 60° C.

The temperature sweep measurements are taken on a temperature curve increasing by 1.5° C. per minute, starting from a minimum temperature below the glass transition temperature Tg of the material up to a maximum temperature. Before taking the measurements, the test specimen is stabilized at the minimum temperature for at least 20 minutes. The glass transition temperature Tg is the temperature at which the dynamic loss tan δ reaches a maximum during the temperature sweep.

Generally, a tire comprises a crown provided radially on the outside with a tread that is intended to come into contact with the ground via a tread surface, two beads that are intended to come into contact with a rim on which the tire is mounted, and two sidewalls that join the crown to the beads. A tire for an agricultural vehicle comprises a carcass reinforcement, anchored in each bead, usually made up of at least one layer of textile reinforcing elements.

The carcass reinforcement is usually surmounted radially on the outside by a crown reinforcement made up of a plurality of layers known as working layers, each working layer being made up of textile or metal reinforcing elements, these reinforcing elements being coated in an elastomeric material. The reinforcing elements are generally crossed from one layer to the next.

The tread, which corresponds to the part of the tire that is intended to come into contact with the ground when running, comprises a bearing surface parallel or substantially parallel to the crown reinforcement of the tire. Moulded integrally on the bearing surface of the tread are rows of main lugs, which extend from an edge of the tread to the equatorial mid-plane. These main lugs are disposed on each side of the equatorial mid-plane of the tire so as to form a V-shaped pattern (known as a chevron pattern), the tip of the V-shaped pattern being intended to come into contact with the ground first. The main lugs are spaced apart from one another so as to form furrows or grooves; the width of these furrows is determined so as to allow good operation both on the road and on loose ground. The main lugs exhibit symmetry with respect to the equatorial mid-plane of the tire, usually with a circumferential offset between the two rows of lugs, similar to that obtained by one half of the tread being rotated about the axis of the tire with respect to the other half of the tread. Moreover, the lugs may be continuous or discontinuous and may be distributed circumferentially with a spacing that is constant or variable.

Each main lug comprises a contact face radially on the outside and lateral faces that begin at the bearing surface of the tread. The lateral faces meet in the median part of the tread by way of at least one end face of the main lug. The contact face radially on the outside is the only face intended to come into contact with a road when running on the road. When running on loose ground, the tread comes into contact with the soil at this contact face radially on the outside and also with the lateral and end faces. Depending on the nature of the ground and the pressure and load conditions of the tire, even the bearing surface may come into contact with the ground.

In the circumferential direction, a main lug extends over a mean width measured as the distance between the leading lateral face and the trailing lateral face. The leading lateral face or front face intersects the contact face radially on the outside at an edge corner, this edge corner, known as the leading edge corner, coming into contact with the ground first. The trailing lateral face or rear face intersects the contact face radially on the outside at an edge corner, this edge corner, known as the trailing edge corner, coming into contact with the ground after the leading edge corner of the same main lug.

A lug usually extends at a mean angle of inclination, with respect to the axial direction, of close to 45°. The mean angle of inclination is equal to the angle of a straight line segment passing through the respectively axially outer and inner end points of the mean line of the contact face, this mean line being formed by all of the points of the contact face that are equidistant from the leading and trailing edges.

In order to solve a problem encountered when running on curved paths with a small radius of curvature, it has been proposed to interpose, between the main lugs and on each side of the equatorial plane, secondary lugs with a length less than the length of the main lugs. Besides protecting the bearing surface of the tread, these secondary lugs have a reducing effect on the level of stresses supported by the main lugs when running. This is the case notably in the documents U.S. Pat. Nos. 4,383,567 and 4,534,392. Other documents, such as U.S. Pat. Nos. 5,046,541 and 5,411,067, respectively describe discontinuous long (or main) lugs and short (or additional) lugs in order to substantially improve the resistance to uneven wear that can arise with this type of construction.

This difference in length makes it possible to change the surface void ratio of the tread in the transverse direction.

Although these solutions do have an advantage in terms of improving the resistance of the tread to wear when running in curves, the development of the working conditions of agricultural vehicles requires an improvement in the performance properties of such tires.

The objective of the present invention is to further improve the resistance of the tread and that of the tire during phases of running on the road and in particular when running on curved paths, without, however, reducing the performance level when running on loose ground.

SUMMARY OF THE INVENTION

This objective has been achieved according to the invention by a tire for an agricultural vehicle, comprising a tread of width W surmounting a crown reinforcement, the latter surmounting a carcass reinforcement. The width W of the tread is determined between axially outermost points of the external profile of the tread. When the external profile of the tread has no slope discontinuity, the axial limit is taken to be the region in which the angle of the tangent to the profile of the tread with a direction parallel to the axis of rotation is equal to 30 degrees.

The crown reinforcement comprises a plurality of working layers that are each formed by a plurality of reinforcers that are oriented at one and the same mean angle with respect to the circumferential direction and are crossed from one layer to the next.

Furthermore, the tread comprises a bearing surface on which a plurality of main lugs are formed on each side of the equatorial mid-plane, these main lugs being oriented at a mean angle, defined as the angle of a straight line passing through the end points of a main lug, this mean angle being other than zero with the axial direction of the tire, these main lugs being disposed around the tire at a mean spacing P and extending from an edge of the tread to the equatorial mid-plane so as to form a V-shaped pattern, the tip of this V-shaped pattern being intended to come into contact with the ground first during running.

These main lugs extend, on each side of the equatorial plane, axially beyond the axial end of the working layer of the axially widest crown reinforcement. Each main lug has a height Hp and a mean minimum width Ep defined as the mean width along the length of the main lug.

This tread also comprises, on each side of the equatorial mid-plane, a plurality of secondary lugs extending in the transverse direction between an external axial limit of the tread and a width Ls measured with respect to the mid-plane, this width Ls being between 40% and 60% of the half-width (W/2) of the tread; each secondary lug is interposed between two main lugs and has a width Es of between 20% and 40% of the mean spacing P between two main lugs.

These secondary lugs extend, on each side of the equatorial plane, axially beyond the axial end of the working layer of the axially widest crown reinforcement.

Moreover, this tire is characterized in that:
the main lugs and the secondary lugs comprise, in the radial direction (thickness direction), a lens made of a first material, each lens extending axially on either side of the set of axial ends of the working layers, each lens being surmounted by a second material that extends, in the new state, as far as the contact face of the main lugs and secondary lugs,
the first material forming a lens in each main lug and each secondary lug has a viscous modulus $G''1$ and a complex modulus $G*1$, these moduli being measured at 60° C.,
the second material in each main lug and each secondary lug has a viscous modulus $G''2$ and a complex modulus $G*2$, these moduli being measured at 60° C.

These moduli satisfy the following relationships:
the viscous modulus $G''1$ of the first material is at most equal to 60% of the viscous modulus $G''2$ of the second material;

the complex modulus G*1 of the first material is different from the complex modulus G*2 of the second material, the difference between these complex moduli being at most equal to 30% of the complex modulus G*2 of the second material.

By virtue of this construction, it is possible to substantially reduce the mechanical stresses on the main lugs in a region localized axially on and on either side of the ends of the working layers, even after prolonged use.

Preferably, the complex modulus G*1 of the first material forming the lenses is less than the complex modulus G*2 of the second material.

Preferably, the lens in each lug extends along the entire length of the lug, be it a main lug or secondary lug.

In another construction, the lenses covering the axial ends of the second working layer are continued towards the equatorial mid-plane so as to extend across the entire width of the tread.

In an advantageous variant, the thickness of the first material constituting the lens in each main or secondary lug is—in its thickest part—at least equal to 20% and at most equal to 60% of the thickness of each lug.

In an advantageous variant, the maximum thickness of the first material in the secondary lugs is greater than the maximum thickness of the first material in the main lugs. The difference is preferably at least equal to 4%.

The difference between the lengths of the main and secondary lugs is, as can be seen, compensated by the presence of lenses of different heights in each of said lugs.

Advantageously, the surface void ratio of the central part of the tread, this central part being delimited axially by planes perpendicular to the axis of rotation and passing through the axial ends of the secondary lugs situated on either side of the equatorial mid-plane, is at least equal to 60% and at most equal to 70%. In combination with the surface void ratio of the central part that has just been defined, the surface void ratio of the edge parts of the tread that are situated axially on the outside of the central part is advantageously between 40% and 55%.

Advantageously, the difference between the surface void ratio of the central part and the surface void ratio of each edge part is at least equal to 15%.

Further features and advantages of the invention will become apparent from the following description given with reference to the appended drawing, which shows, by way of course of non-limiting example, an embodiment of the subject matter of the invention.

DESCRIPTION OF THE FIGURES

Figure 1:
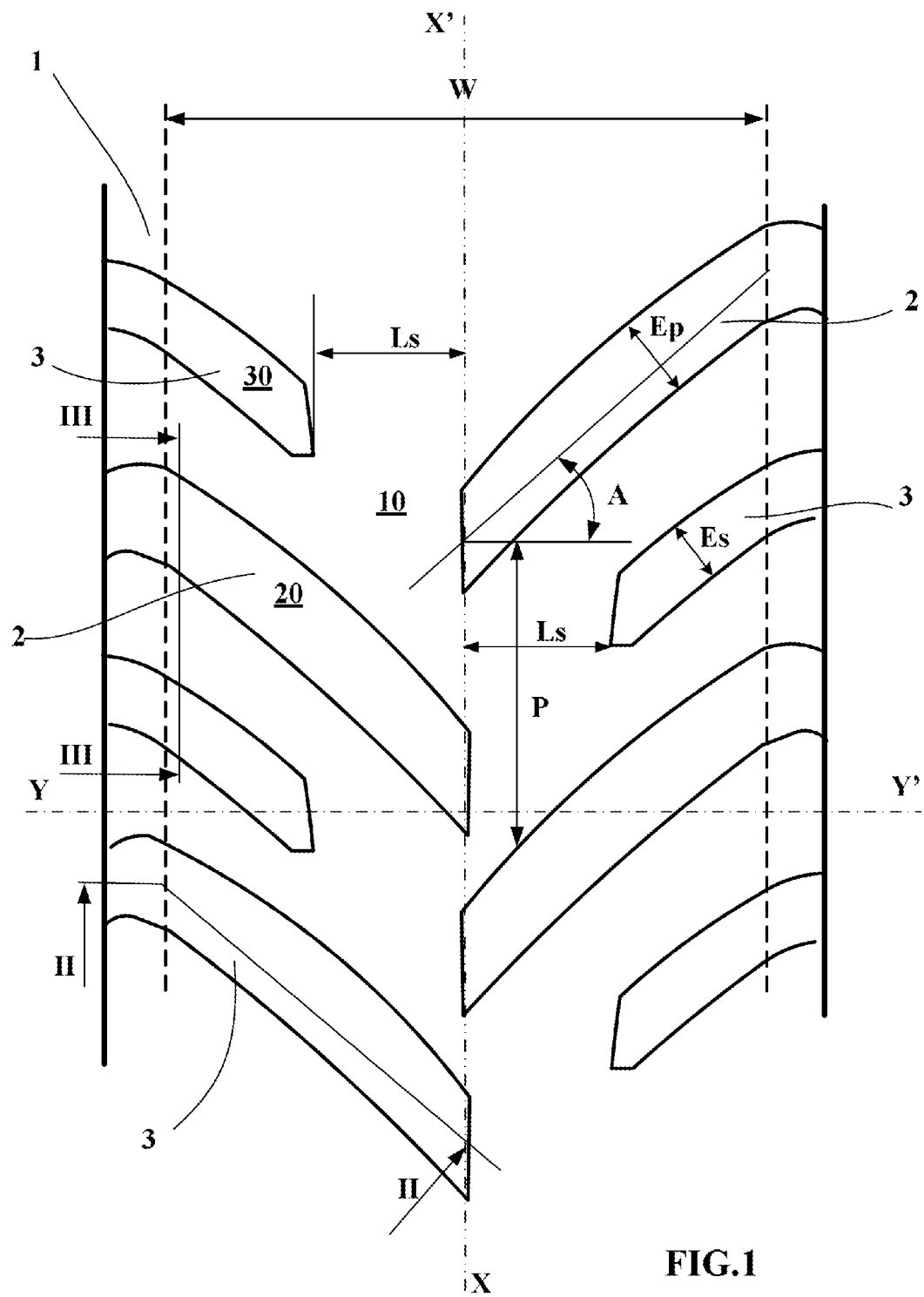
FIG. 1 shows a partial view of the tread surface of the tread of the tire according to the invention.
Figure 2:
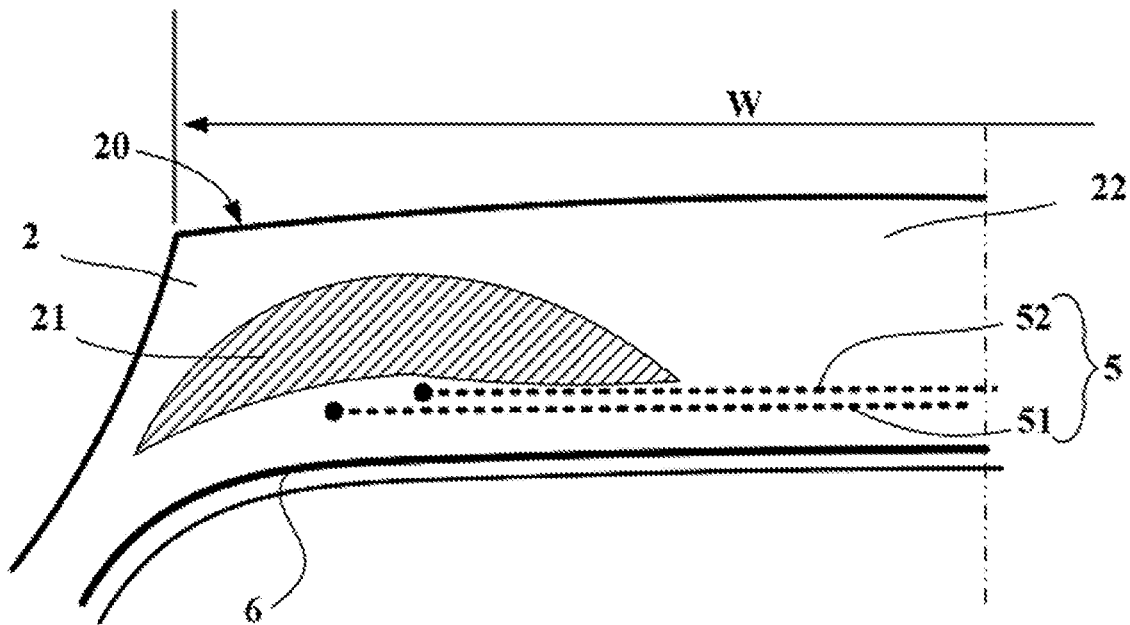
FIG. 2 shows a section embodied by the line II-II of a main lug of the tire in FIG. 1.

A tire 1 according to the invention is described here, this tire, of size 1000/55 R 32, being intended to equip a multipurpose agricultural vehicle. FIG. 1 shows a partial view of the tread surface of the tread. This tread 11 has a width W equal to 1003 mm, this width corresponding to the contact width on flat ground for working conditions in terms of pressure and load as are defined in the standards. This tread covers a crown reinforcement formed in the present case by the stack of two layers, as shown in FIG. 2.

An equatorial mid-plane divides the tread into two parts of equal widths. This plane intersects the plane of FIG. 1 along the line XX'.

As can be seen in this FIG. 1, the tread 1 comprises a bearing surface 10 on which a plurality of main lugs 2 are moulded on each side of the equatorial mid-plane XX', these main lugs 2 forming a mean angle A other than zero with the axial direction YY' of the tire. These main lugs 2 are disposed around the tire at a mean spacing P equal to 422 mm. Each main lug 2 extends from an axial limit of the tread to the equatorial mid-plane XX' so as to form a V-shaped pattern, the tip of this V-shaped pattern being intended to come into contact with the ground first during running.

Each main lug 2 has a contact face 20 intersecting lateral faces, the latter beginning at the bearing surface 10 of the tread. Each main lug 2 has a mean minimum width Ep defined as the mean width along the length of the main lug, which is equal to 81 mm in the present case. Each main lug 2 has a height Hp measured with respect to the bearing surface 10 equal to 40 mm.

This tread 1 also comprises, on each side of the equatorial mid-plane XX', a plurality of secondary lugs 3 extending between an external axial limit of the tread and a width Ls equal to 285 mm (this width Ls being measured from the mid-plane XX'), each secondary lug 3 interposed between two main lugs 2 having a mean width Es equal to 59 mm.

The main lugs 2 and secondary lugs 3, as can be understood from FIG. 2, extend axially beyond the end of the axially widest working layer.

In FIG. 2, which shows a section along a main lug 2, the profile of the lens 21 made of a first material enveloped in a complementary part 22 made of a second material can be seen, this complementary part 22 extending the lens 21 radially towards the outside as far as the tread surface 20 of the main lug 2 in the new state. Moreover, this complementary part 22 laterally envelops the lens 21 as far as the lateral faces of the main lug.

Figure 3:
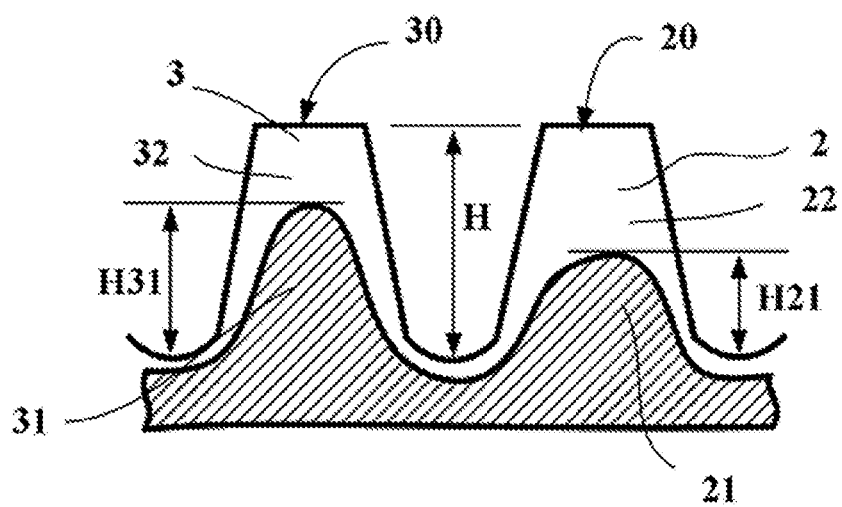
FIG. 3 shows a section taken on a section plane, the line of which is indicated in FIG. 1 by the line III-III, this section sectioning both a main lug and a secondary lug.

The same configuration is found in each secondary lug 3, as can be seen in FIG. 3, which shows a section through both a main lug 2 and a secondary lug 3. Each secondary lug 3 comprises a lens 31 surmounted by a complementary part 32 as far as the contact face 30 of the secondary lug 3.

Each lens 21, 31, whether in the main lugs 2 or in the secondary lugs 3, extends axially on either side of all of the axial ends of the working layers 51, 52 of crown reinforcement 5.

The first material forming a lens in each main lug and each secondary lug has a viscous modulus G"1 and a complex modulus G*1, and the second material in each main lug and each secondary lug has a viscous modulus G"2 and a complex modulus G*2.

These moduli satisfy the following relationships:
At 60° C., the viscous modulus G"1 of the first material is equal to 0.4 MPa while the viscous modulus G"2 of the second material is equal to 0.96 MPa.
At 60° C., the complex modulus G*1 of the first material is equal to 1.31 MPa and the complex modulus G*2 of the second material is equal to 1.62 MPa.

FIG. 3 shows that the lens 21 formed in each main lug 2 extends radially to a lower height than the lens 31 formed in each secondary lug 3, so as to cause the lenses 31 formed in the secondary lugs 3 to appear at the tread surface as a result of wear and to come into contact with the roadway before the lenses 21 formed in the main lugs 2. In this way, it is possible to balance the functioning of the main lugs and the secondary lugs.

The maximum thickness H31 of the lens 31 in the secondary lugs 3 is greater than the maximum thickness H21 of the lens 21 formed in the main lugs 2. In the present case, the height H31 is greater than 42% of the total height H of the secondary lug 3, while the height H21 is at most equal to 40% of the total height H of the main lug 2 (the main lugs and secondary lugs exhibit the same height H).

In the example described, the surface void ratio of the central part of the tread, this part being delimited axially by two planes perpendicular to the axis of rotation and passing through the axial ends of the secondary lugs 3 situated on either side of the equatorial mid-plane, is equal to 66%. In combination, the surface void ratio of the edges of the tread, that is to say of the parts of the tread comprising both the main lugs and the secondary lugs, is equal to 50%.

The invention described by way of these two examples is not intended to be limited to just these variants, and various modifications can be made thereto while remaining within the scope as defined by the claims. In particular, the extent in the axial direction of each of the lenses formed in the main lugs or secondary lugs.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an agricultural vehicle, comprising a tread of width W surmounting a crown reinforcement, this crown reinforcement surmounting a carcass reinforcement and comprising a plurality of working layers each formed by a plurality of reinforcers that are oriented at one and the same mean angle with respect to the circumferential direction and are crossed from one layer to the next, this tread having a bearing surface on which a plurality of main lugs that are disposed around the tire at a mean spacing P are formed on each side of the equatorial mid-plane (XX'), these main lugs being oriented at a mean angle (A) other than zero to the axial direction of the tire, this mean angle being defined as the angle of a straight line passing through the end points of a main lug, these main lugs extending from an edge of the tread as far as the equatorial mid-plane so as to form a V-shaped pattern, the tip of this V-shaped pattern being intended to come into contact with the ground first during running, these main lugs extending, on each side of the equatorial mid-plane, axially beyond an axial end of a working layer of the axially widest crown reinforcement, this tread also comprising, on each side of the equatorial mid-plane, a plurality of secondary lugs that extend, on each side of the equatorial mid-plane, between an axial limit of the tread and an axial limit at a distance from the equatorial mid-plane by a width Ls of between 40% and 60% of the half-width (W/2) of the tread, each secondary lug being interposed between two main lugs and having a mean width Es of between 20% and 40% of mean spacing P between two main lugs, each secondary lug extending axially beyond the axial end of the working layer of the axially widest crown reinforcement, wherein: the main lugs and the secondary lugs comprise, in the radial direction, a lens made of a first material, each lens extending axially on either side of the set of axial ends of the working layers, each lens being enveloped by a second material that extends, in the new state, as far as the contact face of the main lugs and the secondary lugs, the first material forming a lens in each main lug and each secondary lug has a viscous modulus $G''1$ and a complex modulus $G^*1$, these moduli being measured at 60° C., the second material in each main lug and each secondary lug has a viscous modulus $G''2$ and a complex modulus $G^*2$, these moduli being measured at 60° C., these moduli satisfying the following relationships: the viscous modulus $G''1$ of the first material is at most equal to 60% of the viscous modulus $G''2$ of the second material, and the complex modulus $G^*1$ of the first material is different from the complex modulus $G^*2$ of the second material, the difference between these complex moduli being at most equal to 30% of the complex modulus $G^*2$ of the second material.

2. The tire according to claim 1, wherein the complex modulus $G^*1$ of the first material forming a lens in each main lug and each secondary lug is less than the complex modulus $G^*2$ of the second material.

3. The tire according to claim 2, wherein the respective lenses in each main lug and secondary lug extend along the entire length of said lug.

4. The tire according to claim 1, wherein the respective lenses in each main lug and secondary lug extend along the entire length of said lug.

5. The tire according to claim 4, wherein the first material forming the lenses covering the axial ends of the working layer of the axially widest crown reinforcement is continued towards the equatorial mid-plane so as to extend across the entire width W of the tread.

6. The tire according to claim 1, wherein the first material forming the lenses covering the axial ends of the working layer of the axially widest crown reinforcement is continued towards the equatorial mid-plane so as to extend across the entire width W of the tread.

7. The tire according to claim 6, wherein a thickness of the first material constituting the lens in each main or secondary lug is, in its thickest part, at least equal to 20% and at most equal to 60% of the thickness of each lug.

8. The tire according to claim 1, wherein a thickness of the first material constituting the lens in each main or secondary lug is, in its thickest part, at least equal to 20% and at most equal to 60% of the thickness of each lug.

9. The tire according to claim 1, wherein a maximum thickness of the lens in the secondary lugs is greater than the maximum thickness of the lens in the main lugs.

10. The tire according to claim 1, wherein the surface void ratio of a central part of the tread, this central part being delimited axially by planes perpendicular to the axis of rotation and passing through axial ends of the secondary lugs situated on either side of the equatorial mid-plane, is at least equal to 60% and at most equal to 70%, the surface void ratio of edge parts of the tread that are situated axially on the outside of the central part being between 40% and 55%.

11. The tire according to claim 10, wherein a difference between the surface void ratio of the central part and of the edge parts of the tread is at least equal to 15%.

* * * * *